United States Patent [19]

Klein

[11] Patent Number: 4,750,321
[45] Date of Patent: Jun. 14, 1988

[54] SICKLE

[75] Inventor: Darrel J. Klein, Breckenridge, Minn.
[73] Assignee: Darin D. Klein, Breckenridge, Minn.
[21] Appl. No.: 842,192
[22] Filed: Mar. 21, 1986
[51] Int. Cl.⁴ ............................................ A01D 34/17
[52] U.S. Cl. ...................................... 56/310; 56/308; 56/298
[58] Field of Search ................ 56/298, 296, 299, 307, 56/308, 310, 311

[56] References Cited

U.S. PATENT DOCUMENTS

| 449 | 4/1857 | Hussey | 56/310 |
|---|---|---|---|
| 2,138,305 | 11/1938 | Null | 56/298 |
| 2,722,798 | 11/1955 | Spedding et al. | 56/298 |

FOREIGN PATENT DOCUMENTS 628895 9/1949 United Kingdom ................. 56/309

Primary Examiner—John Weiss
Attorney, Agent, or Firm—James V. Harmon

[57] ABSTRACT

A power operated sickle is provided having a plurality of stationary guards projecting forwardly from a sickle bar with relatively narrow guide channels between them wherein the channels between the guards have a length-to-width ratio on the order of about 2/1 or greater, the center distances between the guards are about twice the width of the channel between the guards and the cutting teeth cooperating with the guards are pitched to extend laterally a distance of about ⅓ the distance between the centers of the guards whereby an angle of less than about 20° is established between the cutting edges of the teeth and the cooperating side edges of the guards. The centers of the guards are spaced less than about 2" apart and each guard includes longitudinally extending downwardly projecting keel with a height on the order of about two times the width of the guard to provide an improved overall geometrical configuration for increasing cutting capacity while at the same time reducing the tendency of material to clog the sickle.

2 Claims, 2 Drawing Sheets

SICKLE

FIELD OF THE INVENTION

The present invention relates to agricultural equipment and more particularly to an improved power operated reciprocating sickle.

BACKGROUND OF THE INVENTION

Many sickle mechanisms have been previously proposed for agricultural use. However, of numerous designs that have been tried, there are now two major designs in commercial use. In one design, the reciprocating cutting teeth or blades are relatively narrow with edges 30° apart but the stationary guides between them are short and stubby and have exposed points, i.e., unenclosed knife ends. In a second design now in commercial use, the stationary guards are narrow and pointed but are spaced relatively far apart and the cutting edges of the blades diverge at a 60° angle.

In developing the present invention, I have over a period of many years evaluated and tested these and other commercially available sickles with a variety of different kinds of crops from Louisiana to Saskatchewan. During this evaluation, several important shortcomings have become apparent. One major problem is the limitation in cutting capacity, that is to say, the speed at which the implement can be driven through the field and still reliably perform its intended function. Second is the tendency for stems or trash to become jammed in the working parts of the sickle. Third is the tendency for parts to become prematurely worn or broken. Other problems are also significant such as the problems created by the hold-down units that keep the moving blades in place. Some of the previous hold-down units contribute to clogging and thereby limit capacity. Thus, for example, in harvesting wheat with prior equipment, it may be possible to run the implement at a speed of only about 2 miles per hour. However, if conditions become more difficult; for example, if the straw is tough or matted, it is further reduced. In harvesting soybeans when the ground is wet, the stems tend to wedge in the area between the base of the guards, that is to say, adjacent the back ends of the guards where they are attached to the sickle bar, and the speed of the vehicle may have to be decreased to only 1 mile per hour or it may be necessary to stop the implement periodically and clean the sickle by hand. One objective of the invention is to provide an improved sickle which allows increased ground speeds that may reach twice the ground speed permitted by equipment that does not embody the present invention. A further object is to reduce the tendency for stems and other trash to clog and collect in the spaces between the sickle guards, which if able to occur interferes with efficient operation.

Many of the problems associated with prior devices and their limited capacity were found to derive from shortcomings in the geometry and shape of the components. For example, the distance between the guards, it was discovered, was not optimally related to the length of the guards, and the center distance between the guards was not properly related to the width of the throat or channel between the guards. Furthermore, the cutting angle between each tooth and the side edge of the guard with which it cooperates was not properly selected to cooperate efficiently with the channel dimensions.

In view of these and other deficiencies of the prior art, it is a major objective of the invention to provide an improved sickle for agricultural use wherein improvements in the relative placement and geometry of the several parts cooperate together to improve performance and particularly the cutting capacity so that ground speeds can be doubled or more than doubled in some cases while, at the same time, reducing the amount of clogging that takes place without a sacrifice in product life or the requirement for replacement of worn parts.

These and other more detailed and specific objects of the invention will become apparent in view of the accompanying description which sets forth the invention by way of example.

SUMMARY OF THE INVENTION

The present invention provides an improved power operated sickle for agricultural use which includes a stationary sickle bar upon which is mounted a reciprocating knife bar. A plurality of laterally distributed forwardly extending guides are mounted in side-by-side arrangement on the stationary sickle bar. A plurality of knives or teeth are mounted on the knife bar. The guards include a horizontally disposed forwardly extending rearwardly opening slot in which the teeth are mounted for lateral reciprocation. The points of the guards extend forwardly beyond the teeth for guiding the crops but have no cutting function. The same number of teeth are used as guards and the teeth are spaced apart from one another the same distance as the guards are spaced from each other. The side edges of the adjacent guards are substantially parallel to each other and are aligned with the longitudinal axis of the sickle, forming deep channels for guiding the stems between them. Each of these guiding channels between the guards has a length-to-width ratio L/W on the order of about 2 to 1 or greater. The channels between the guards, in other words, are about two times as long as they are wide. The center distance D between the cutting teeth and the guards are equal to each other. The cutting edge of each tooth is pitched to extend laterally a distance B from the guard about one-third the distance between the centers of the guards, whereby a cutting angle of less than about 20° is established between the cutting edge of each tooth and the cooperating side edge of an adjacent guard. In a preferred form of the invention, the centers of guards are spaced from each other no more than about 2" apart. Utilizing this geometry, the cut stems will neither clog the apparatus not accumulate in the sickle and the cutting capacity of the sickle is improved.

In a preferred form of the invention, the guards are relatively high and narrow and each has a deep keel of reduced thickness extending downwardly from the portion of the guard beneath the tooth receiving slot, and each of the keels has a height on the order of about two times the width of the guard.

THE FIGURES

FIG. 8 is a top perspective view of a guard in accordance with the present invention which, in this instance, is illustrated as a pair of guard members having a common base.

FIG. 9 is a bottom view of the guard of FIG. 8.

FIG. 10 is a front view of the guard and

FIG. 11 is a rear view of the guard.

DESCRIPTION OF THE PREFERRED EMBODIMENTS

Figure 1:
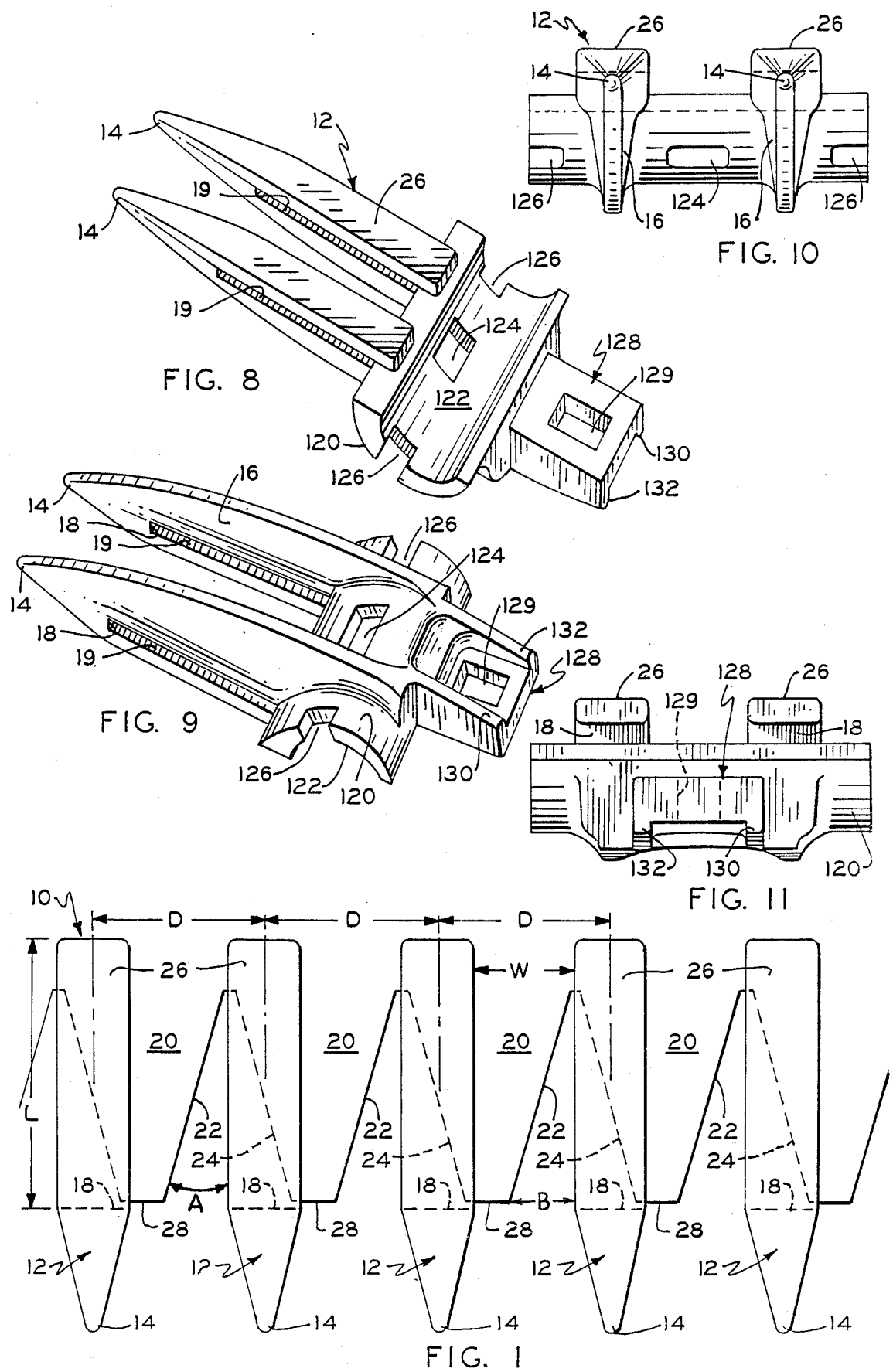
FIG. 1 is a partial diagramatic plan view which illustrates the geometry employed in accordance with the present invention.

In FIG. 1 is shown a power operated sickle 10 in accordance with the present invention. The sickle 10 includes a plurality of laterally spaced apart parallel longitudinally extending stationary guards 12 having points 14 at their forward ends which extend forwardly beyond the cutting blades or teeth 20. The cutting teeth have sharp cutting edges 22 on the right and 24 on the left. The stationary guards 12 are provided with horizontally disposed rearwardly opening slots 19 for the cutting blades which terminate along a forward edge 18 that corresponds with the forward edge 28 of each of the cutting teeth 20. Each of the guards 12 includes an upper guard portion 26 above the slot 19. The side edges of the guards are generally parallel, that is to say, extend generally longitudinally of the apparatus, although they may, if desired, converge slightly toward one another proceeding in the direction of their rearward ends. As clearly shown in FIG. 1, channels are provided between the guards 10 and these channels which function to carry the cut stems rearwardly are open at their rearward ends on the upper surface of the sickle. The length L of the channel and the part of guard 10 excluding the portion forward of the edge 18 of the slot 19 which has no cutting function is at least two times the width W of the channels between the guards 10. The ratio of the length L to the width W of the channel should be at least about 2/1 and is preferably at least about 2.5/1.

The cutting teeth 20 are slideably mounted for lateral reciprocation as will be described below and the center distances between the cutting teeth 20 and the guards 10 (distance D) are equal to each other, that is to say, there are the same number of teeth as guards. The cutting teeth 20 have a relatively steep pitch so that the side edge 22 or 24, as the case may be, is pitched to extend laterally a distance B from the guard 12 of about one-third the distance D between the centers of the guards 12 whereby an angle A of less than about 20° is established between the cutting edges 22, 24, as the case may be, of the teeth 20 and the cooperating side edges of the guards 12. It is also preferred that the centers of the guards themselves be spaced apart at a distance D no greater than about 2" and in the case illustrated, they are spaced at a distance D of 1½" along the length of the sickle. As a result of this improved geometry, many advantages are obtained; one important advantage is that the speed of the sickle over the ground can be increased while the cut stems will have much less tendency to clog or accumulate in the sickle.

Figure 2:
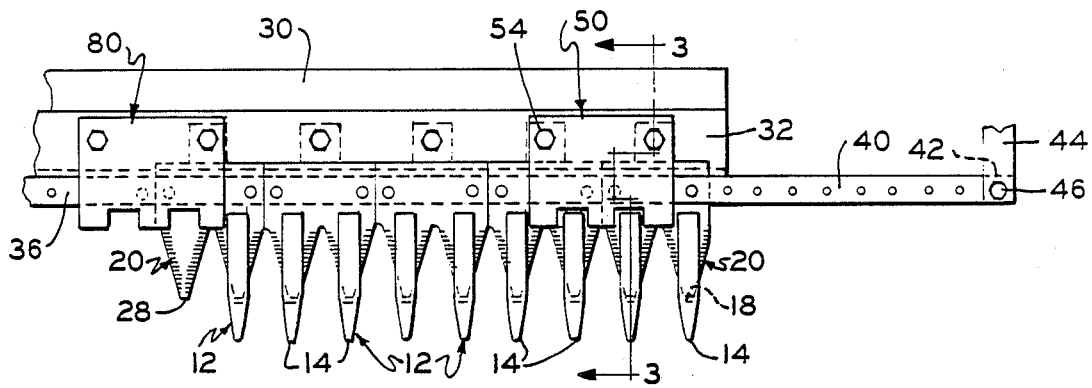
FIG. 2 is a partial plan view of a portion of a sickle embodying the invention on a reduced scale relative to FIG. 1.
Figure 3:
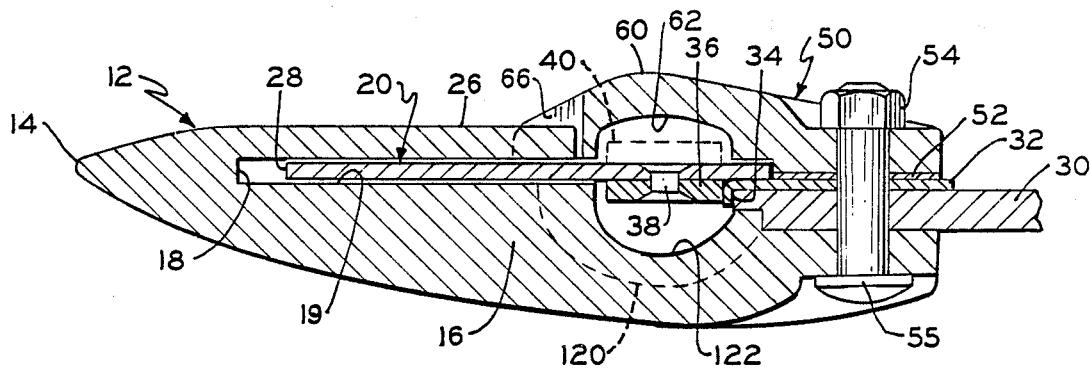
FIG. 3 is a transverse vertical sectional view taken on line 3—3 of FIG. 2.

As shown in FIG. 2, the sickle / includes a stationary horizontally disposed laterally extending stationary sickle bar 30 which is attached conventionally to an agricultural implement (not shown). The sickle bar 30 is supported a few inches above the ground conventionally. Bolted to the sickle bar 30 by means of bolt and nut assemblies 54, 55 are a plurality of laterally spaced apart hold-down units, only two of which 50 and 80 are shown. The hold-down units will be described in more detail below. The guards 12 are secured to the stationary sickle bar 30 from below as shown clearly in FIG. 3 while the hold-down units 50 and 80 are secured by means of the fastener assembly 54, 55 from above. Between the sickle bar and the hold-down units are guides 32 having a turned down flange 34 which serves to guide the horizontally disposed laterally extending knife drive bar 36 to which the blades 20 are connected by means of rivets 38 or other suitable fasteners. Secured to the top of the knife drive bar 36 and extending toward the left in FIG. 2 is a sickle drive connecting rod 40 with an end portion secured to a motor operated reciprocating drive unit 44 by means of a pivot 46. Any suitable commercially available drive unit 44 can be provided to reciprocate the connecting rod 40 and the teeth 20 conventionally.

Figure 4:
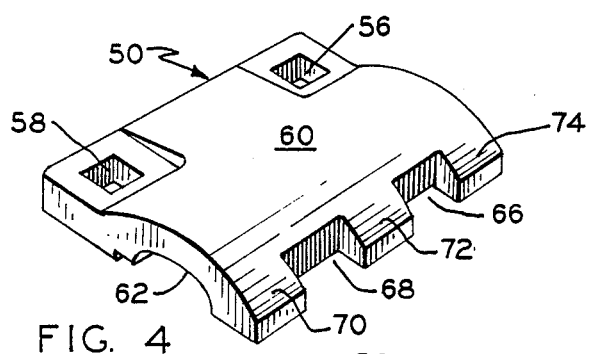
FIG. 4 is a perspective view of a hold-down clamp in accordance with the invention as seen from above.
Figure 5:
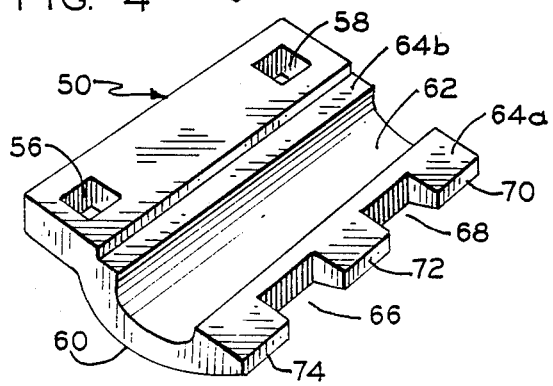
FIG. 5 is a bottom view of the clamp of FIG. 4 as seen in perspective.
Figure 6:
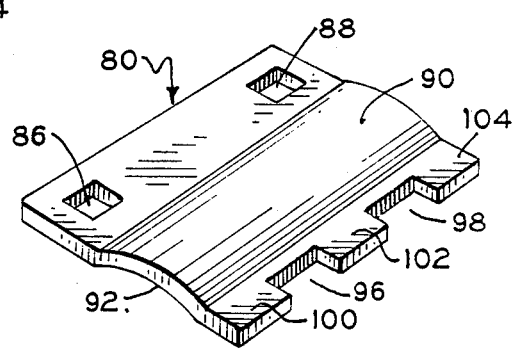
FIG. 6 is a view similar to FIG. 4 of another clamp embodying the invention.
Figure 7:
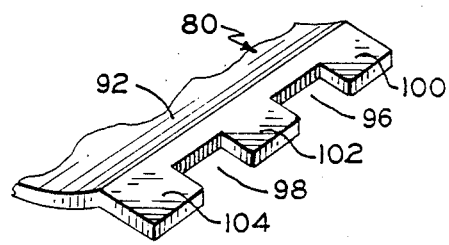
FIG. 7 is a partial bottom view of the clamp of FIG. 6.

The hold-down unit 50 will now be described in more detail. As shown in FIGS. 4 and 5, the hold-down unit 50 which in this instance is preferably a steel forging includes a pair of laterally spaced apart bolt openings 56 and 58 which are preferably rectangular. The hold-down units each include an arched center section that extends over a downwardly opening laterally extending channel 60 through which a portion of the sickle drive connecting rod 40 extends. The bottom surface of the guard is provided with a recess for the cutting blades 20 having a flat upper surface of which there are two portions 64a and 64b on opposite sides of channel 62. To accommodate the teeth 20 correctly, the spacing of the guide surface 64a and 64b above the teeth 20 is adjusted by means of shims one of which is shown at 52. In this way, the channel, bounded on its upper edge by the surface 64a–64b, can be made to accommodate the teeth 20 with a smooth sliding fit. It will be seen that along the forward edge of the hold-down unit 50 are a pair of guard accommodating recesses 66 and 68 bounded on their side edges by means of forwardly projecting fingers 70, 72 and 74. A portion of the guiding surface 64a extends to the rear of both the fingers 70–74 and the recesses 66, 68 so that the cutting teeth 20 are held in place across the entire width of the hold-down unit 50. Because of the greater stresses experienced, the hold-down unit 50 at the supported end of the sickle 10 is larger and stronger than the others which preferably comprise sheet metal stampings as shown in FIGS. 6 and 7. The hold-down units 80 in FIGS. 6 and 7 have the same general outline as the hold-down unit 50 but, as mentioned previously, are formed preferably from sheet metal and are substantially lighter in weight. Each of the hold-downs 80 includes a pair of laterally spaced apart hold openings 86 and 88 on opposite edges and at the rear thereof. Extending forwardly is a centrally located upwardly projecting arch having a downwardly opening laterally extending channel 92 to accommodate the rear end portions of the teeth 20 and particularly upwardly projecting portions of the connectors 38 as they slide back and forth beneath the hold-down unit. Also provided are laterally spaced apart forwardly opening guard accommodating recesses 96 and 98 which are spaced apart by means of forwardly projecting hold-down fingers 100, 102 and 104. These fingers 100–104 project forwardly between the rearward ends of the guards 12 serving to hold the teeth in place as they slide back and forth beneath them. As can be seen, the channel 92 need not be as deep as channel 62 of the hold-down 50 since there is no sickle drive connecting rod 40 connected to the upper surfaces of the teeth 20.

Refer now to FIGS. 3 and 8–11 for a more detailed description of the guards 12. In this instance, the guards 12 are connected together in pairs but alternatively 3, 4 or more guards can be connected together on a single base if desired. The guards 12 in this case are steel forgings and include a base 120 which is generally trough shaped and includes a laterally extending upwardly opening channel 122 shown in FIGS. 8 and 3. Channel 122 includes a drain or discharge opening 124 at the center and optionally similar openings 126 at the edges to prevent cut material from accumulating around the sickle drive bar 36. The discharge openings 124 and 126 are in this instance rectangular in shape. At the rear of the guard is a mounting plate 128 with lateral longitudinally extending vertically disposed reinforcing flanges 130 and 135 which project upwardly from each edge of the plate 128. In the center of the plate 128 is a bolt opening 129 of rectangular shape and in this case somewhat elongated from front to rear to allow fore and aft adjustment of the guards 12.

An important feature of the improved guards in accordance with the invention is the provision of a reinforcing flange or keel 16 extending downwardly from the point of the guard the entire length of the guard beneath the opening 19. In this way, the guard itself is relatively narrow as is shown in FIG. 10. While the width of the guard may be about $\frac{5}{8}''$, the height of the keel 16 is about two times this distance or about $1\frac{1}{8}''$ from the point 14 to the lower edge thereof as shown in FIG. 10. In this way, the upper portion 26 of the guard is a generally flat plate which extends horizontally while the lower portion of the guard comprises a narrow vertically disposed keel with a height that is about three times the width of the plate portion 26. It was found that with the other features already described, a guard of this configuration was highly effective in operation, rugged in construction and relatively low in cost. Many variations are possible, for example, the guards 12 can also be made with only one guard in a single unit, i.e., each guard can be separate from the others.

The invention provides a high capacity sickle with an even feed, that is to say, one in which there is less tendency for cut material or foreign objects to become packed between the guards. This is in part due to the relatively low profile of the hold-down units 50 and 80. Because there is no high rising portion of the hold-down unit, there is less tendency for material to hook or bunch in the sickle which, if it were to occur, would cause uneven feeding or in damp conditions would cause knives to skip due to a buildup of material in front of the hold-down units and under the guards. It will also be seen particularly by comparison of FIGS. 9 and 10 that the portion of the trough 120 extending between the guards comprises a downwardly and rearwardly inclined surface that serves to guide cut material away from the sickle and that on either side thereof the keels 16 are straight which helps to guide the material rearwardly away from the sickle.

While many variations are possible in the cutting blades, it was found that blades 20 having their cutting edges 22°, 24° 30° apart were suitable. The cutting blades can, if desired, be provided with serrations on their cutting edges. In a typical application of the invention, both the blades 20 and the guards 12 have spacings between their centers of $1\frac{1}{2}''$. It will be noted that each of the hold-down units 50 and 80 support the blades all the way across the front of each hold-down unit and between the guards in three spaced-apart areas.

The invention is particularly effective under difficult conditions as when crops are loaded with moisture or with low plants such as soybeans. Under these conditions, the forwardly projecting points help to lift the material into the blades before the stems are cut, thereby keeping the plants above the sickle bar.

Many variations of the present invention within the scope of the appended claims will be apparent to those skilled in the art once the principles described in the above disclosure are understood.

What is claimed is:

1. A power operated sickle for agricultural use comprising, a supporting framework including a horizontally disposed transversely extending sickle bar, a plurality of stationary laterally spaced apart forwardly extending guards on the bar, a plurality of cooperating cutting teeth mounted upon the sickle bar for reciprocation with respect to the guards and the bar, said guards having horizontally disposed rearwardly opening slots to accommodate the teeth and guard points extending forwardly from the slots beyond the teeth for guiding the crops but having no cutting function, the side edges of the adjacent guards being substantially parallel and being aligned with the longitudinal sickle axis defining guide channels, the guide channels having a length-to-width ratio L/W on the order of about 2 to 1 or greater, the distances between the centers of the cutting teeth are equal to the distances D between the guards and are about 1.7 times the transverse width W of the channel between the guards, the cutting edge of each tooth is pitched to extend laterally a distance from the guard of about $\frac{1}{3}$ the distance D between the centers of the guards whereby an angle A of less than about 20° is established between the cutting edge of each tooth and the cooperating side edge of each guard and the centers of the guards are spaced at a distance D from each other not greater than about 2" apart along the length of the sickle bar whereby the cutting capacity of the sickle is increased and there is a reduced tendency for cut stems to clog and accumulate in the sickle during use, a plurality of hold-down brackets are connected to the sickle bar and each of the hold-down brackets includes forward and rearward edges, fastening means at the rearward edges, an upwardly arched downwardly opening center section having a downwardly opening transversely extending channel therethrough, a knife bearing surface to provide sliding support for the upper surface of the cuting teeth and said bearing surface is divided into two portions including one portion rearwardly of the channel and each of said hold-downs includes at least one rearwardly extending forwardly opening recess in the forward edge defining forwardly projecting fingers on either side thereof and said recess being constructed and arranged to receive a rearward edge of said guard with said fingers projecting forwardly on either side thereof to provide sliding support for portions of the teeth between the guards.

2. A power operated sickle for agricultural use comprising, a supporting framework including a horizontally disposed transversely extending sickle bar, a plurality of stationary laterally spaced apart forwardly extending guards on the bar, a plurality of cooperating cutting teeth mounted upon the sickle bar for reciprocation with respect to the guards and the bar, said guards having horizontally disposed rearwardly opening slots to accommodate the teeth and guard points extending forwardly from the slots beyond the teeth for guiding the crops but having no cutting function, the side edges of the adjacent guards being substantially parallel and being aligned with the longitudinal sickle axis defining guide channels, the guide channels having a length-to-width ratio L/W on the order of about 2 to 1 or greater, the distances between the centers of the cutting teeth are equal to the distances D between the guards and are about 1.7 times the transverse width W of the channel between the guards, the cutting edge of each tooth is pitched to extend laterally a distance from the guard of about $\frac{1}{3}$ the distance D between the centers of the guards whereby an angle A of less than about 20° is established between the cutting edge of each tooth and the cooperating side edge of each guard and the centers of the guards are spaced at a distance D from each other no greater than about 2" apart along the length of the sickle bar whereby the cutting capacity of the sickle is increased and there is a reduced tendency for cut stems to clog and accumulate in the sickle during use, a hold-down unit including a pair of rearwardly extending forwardly opening recesses on its forward edge with forwardly projecting fingers on either side thereof along the forward edge of said hold-down unit and the lower surface of each of the finger portions and areas behind the recesses slideably engage the upper surface of the teeth.

* * * * *